United States Patent
Seaton et al.

(10) Patent No.: US 12,481,576 B2
(45) Date of Patent: Nov. 25, 2025

(54) SOFTWARE TESTING

(71) Applicant: Functionize, Inc., Walnut Creek, CA (US)

(72) Inventors: Jonathon R. Seaton, Walnut Creek, CA (US); Tamas Cser, Walnut Creek, CA (US)

(73) Assignee: Functionize, Inc., Walnut Creek, CA (US)

( * ) Notice: Subject to any disclaimer, the term of this patent is extended or adjusted under 35 U.S.C. 154(b) by 210 days.

(21) Appl. No.: 18/287,599

(22) PCT Filed: Apr. 20, 2022

(86) PCT No.: PCT/US2022/025554
§ 371 (c)(1),
(2) Date: Oct. 19, 2023

(87) PCT Pub. No.: WO2022/226075
PCT Pub. Date: Oct. 27, 2022

(65) Prior Publication Data
US 2024/0184692 A1    Jun. 6, 2024

Related U.S. Application Data

(60) Provisional application No. 63/178,502, filed on Apr. 22, 2021.

(51) Int. Cl.
G06F 9/44 (2018.01)
G06F 11/3668 (2025.01)
G06F 11/3698 (2025.01)

(52) U.S. Cl.
CPC ...... *G06F 11/3688* (2013.01); *G06F 11/3698* (2025.01)

(58) Field of Classification Search
CPC .................. G06F 11/3688; G06F 11/3698
See application file for complete search history.

(56) References Cited

U.S. PATENT DOCUMENTS

| | | |
|---|---|---|
| 2015/0347284 A1 | 12/2015 | Hey et al. |
| 2018/0197103 A1* | 7/2018 | Petursson .............. G06N 20/00 |
| 2020/0034279 A1 | 1/2020 | Shivam et al. |
| 2020/0097724 A1* | 3/2020 | Chakravarty .......... G06V 10/82 |

OTHER PUBLICATIONS

Document: create TreeWalker() method. MDN. Revised Jul. 25, 2024. Accessed Oct. 8, 2024. [URL: developer.mozilla.org/en-US/docs/Web/API/Document/createTreeWalker].
International Search Report and Written Opinion for PCT/US2022/025554, mailed Aug. 18, 2022, 16 pages.

* cited by examiner

*Primary Examiner* — Hang Pan
(74) *Attorney, Agent, or Firm* — Brian F. Russell

(57) ABSTRACT

Provided herein is technology relating to testing software and particularly, but not exclusively, to systems and methods for visually validating a step in a software test case and using the visual validation to reinforce an element selection model, the technology provides methods for visually validating a step in a software test case. More particularly, embodiments of the technology provide a method of mapping web elements of a website or app to a visual screenshot of that website or app by combining data from the document object model (DOM) and page screenshot.

21 Claims, 1 Drawing Sheet

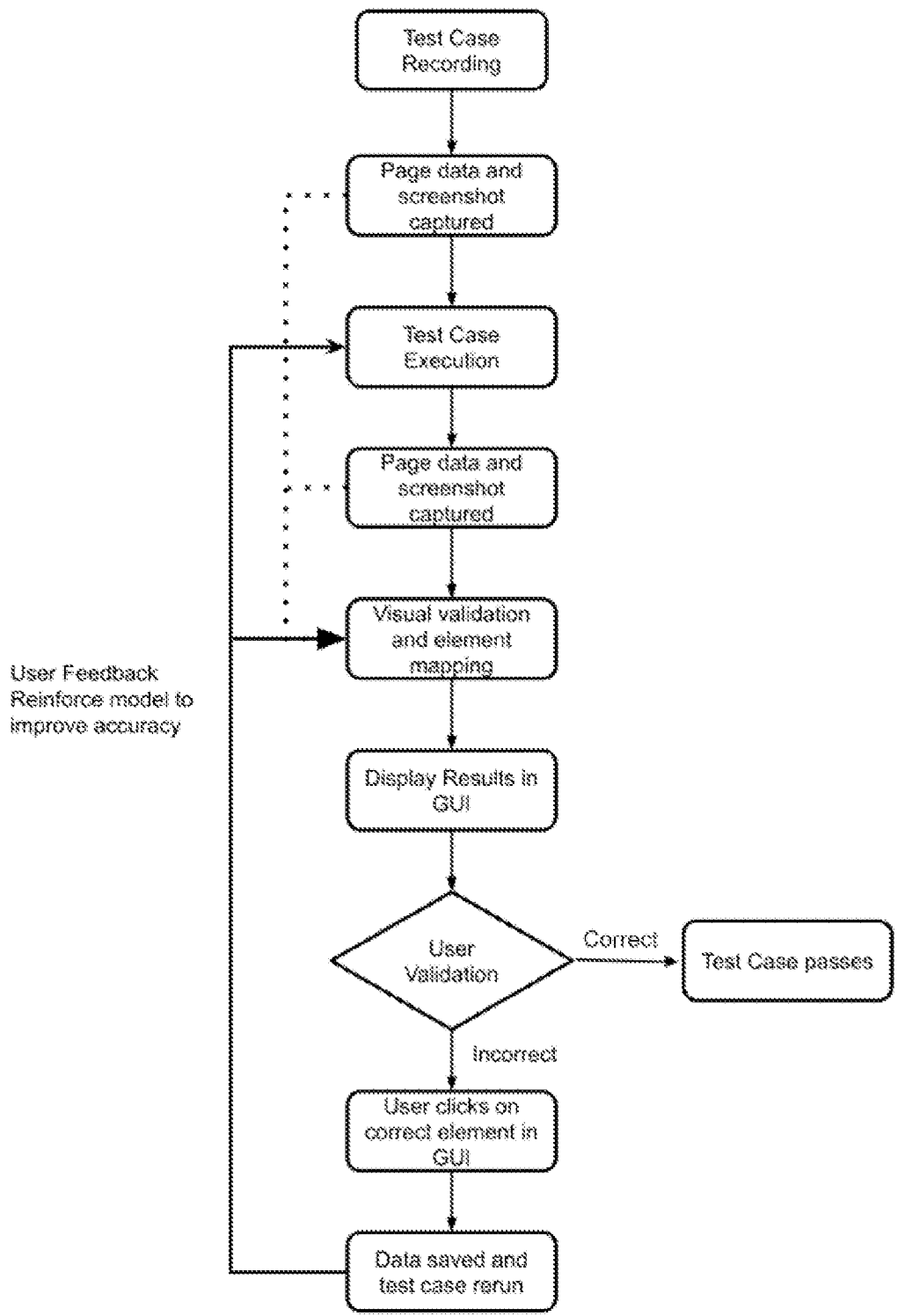

SOFTWARE TESTING

This application is a national phase application under 35 U.S.C. § 371 of PCT International Application No.: PCT/US2022/025554, filed on Apr. 20, 2022, which claims priority to U.S. provisional patent application Ser. No. 63/178,502, filed Apr. 22, 2021, each of which is incorporated herein by reference in its entirety.

FIELD

Provided herein is technology relating to testing software and particularly, but not exclusively, to systems and methods for visually validating a step in a software test case and using the visual validation to reinforce an element selection model.

BACKGROUND

Pixel-based methods are used to visually validate a webpage or app. Such techniques directly compare pixels from one screenshot to pixels of another screenshot. Transformations of images to segment images into elements have also been shown using visual boundaries as indicators that an element is present. These techniques include applying edge detection such as Canny or Sobel filters, feature point recognition such as SIFT, SURF, or ORB transforms, or element classification algorithms.

However, some pixel-based technologies are limited. For example, changes in text content of a web-page or an application may cause pixels representing ASCII characters to appear to be misaligned and thus fail a visual validation check, when in fact the multitude of character differences may only represent a singular web element such as a paragraph <p> element. Further, some web elements do not have a directly corresponding visual in an image or have a visual that is split across a number of elements, e.g., white text on a white background or a logo comprising both an image and a text overlay. In these cases, pixel-based methods will fail to identify the root cause difference in these images.

SUMMARY

Accordingly, the technology provided herein relates to testing software and particularly, but not exclusively, to systems and methods for visually validating a step in a software test case and using the visual validation to reinforce an element selection model. In some embodiments, the technology provides methods for visually validating a step in a software test case. More particularly, embodiments of the technology provide a method of mapping web elements of a website or app to a visual screenshot of that website or app by combining data from the document object model (DOM) and page screenshot.

Accordingly, in some embodiments, the technology provides a method for visually validating a software test case. In some embodiments, the methods comprise obtaining document object model (DOM) information; obtaining a first screenshot of a web page; executing a step of a test script of user actions acting on the web page; obtaining a second screenshot of the web page; comparing the first screenshot and the second screenshot to identify a visual screenshot variation; and identifying a web page element using the screenshot variation and the DOM information. In some embodiments, the method further comprises displaying the first screenshot or second screenshot to a user; overlaying a box on the first screenshot or second screenshot outlining a segment of the first screenshot or second screenshot comprising an image of the web page element; and receiving user input indicating that the box correctly or incorrectly identifies the web page element. In some embodiments, the method further comprises training a model and/or a neural network using the user input. In some embodiments, the method further comprises providing the test script by recording user actions. In some embodiments, In some embodiments, executing a step of a test script of user actions occurs on a local computer. In some embodiments, executing a step of a test script of user actions occurs on a cloud computing component (e.g., on a server, computer, virtual machine, etc. remote from the user). In some embodiments, executing a step of a test script of user actions comprises performing element selection for the step of the test script. In some embodiments, methods further comprise segmenting the first screenshot or second screenshot using the visual screenshot variation and DOM information to provide a segment of the first screenshot or second screenshot comprising an image of the web page element. In some embodiments, methods further comprise correlating a web page element and a screenshot variation and/or correlating a DOM element and a screenshot variation. In some embodiments, methods further comprise displaying a correlation result describing the web page element and an image of the correlated web page element and/or describing the web page element and the correlated DOM element. In some embodiments, methods further comprise displaying on a graphical user interface the web page and/or a screenshot of the web page and displaying the results of each step of a test script of user actions. In some embodiments, the method comprise receiving user inputs to pause the test script, move forward through the steps of the test script, and/or move forward through the steps of the test script.

In some embodiments, the technology provides a system, e.g., a system comprising a processor configured to perform a method described herein. In some embodiments, systems further comprise a display and user input device. In some embodiments, systems further comprise software code describing the web page. In some embodiments, systems further comprise software code describing the test script.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

FIG. 1 is a flowchart showing an embodiment of a method for visually validating a step in a software test case.

It is to be understood that the figures are not necessarily drawn to scale, nor are the objects in the FIGURES necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to testing software and particularly, but not exclusively, to systems and methods for visually validating a step in a software test case and using the visual validation to reinforce an element selection model.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "display-free" system does not comprise a display, a "clicking-free" method does not comprise a clicking step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present" or "absent") is used in a relative sense to describe the amount or level of a particular entity (e.g., component, action, element). For example, when an entity is said to be "present", it means the level or amount of this entity is above a pre-determined threshold; conversely, when an entity is said to be "absent", it means the level or amount of this entity is below a pre-determined threshold. The pre-determined threshold may be the threshold for detectability associated with the particular test used to detect the entity or any other threshold. When an entity is "detected" it is "present"; when an entity is "not detected" it is "absent".

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods. For example, a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform a function of the system or subsystem. Thus, the methods and apparatus of the embodiments, or certain aspects or portions thereof, may take the form of program code (e.g., instructions) embodied in tangible media, such as floppy diskettes, CD-ROMs, hard drives, flash memory, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (e.g., volatile and non-volatile memory and/or storage elements), at least one input device, and at least one output device. One or more programs may implement or utilize the processes described in connection with the embodiments, e.g., through the use of an application programming interface (API), reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and combined with hardware implementations.

As used herein, the term "web application" refers to a client-server computer program that is executed by the client in a web browser. Common web applications include webmail, online retail sales, and online auction. In some embodiments, the web application comprises a user interface and/or client-side logic (e.g., code executed on a client computer). In some embodiments, a web application comprises one or more web pages and the user interface refers to the appearance, design, and elements of the one or more web pages. In some embodiments, a web page (e.g., web application) has an associated "document object model" (DOM). A DOM is a cross-platform and language-independent interface that treats an XML or HTML document as a tree structure wherein each node is an object representing a part ("element") of the document. The DOM represents a document as a logical tree of nodes correlated to web page elements. When a web page (e.g., web application) is loaded, a browser creates a DOM of the page. In some embodiments, the DOM is an object oriented representation of an HTML document that acts as an interface between code (e.g., JavaScript) and the document (e.g., web page) itself.

As used herein, the term "element" refers to a UI visual component and/or data structure that can be identified by an element definition, an identifier, and/or relationships with one or more other elements. For example, an element may have a unique identifier that is a string, such as a name, number, or symbol. Accordingly, the element may be referenced and/or retrieved using the identifier. Further, if a particular element is the first child element of a parent element, then the particular element may be referenced and/or retrieved using a pointer to the parent element and then retrieving a pointer to the first child element. A browser and/or runtime environment may provide one or more Application Programming Interfaces ("APIs") for referencing and/or retrieving elements. Thus, in some embodiments, the term "element" refers to a component of a software application (e.g., a web application (e.g., a graphical component of a graphical user interface of an application)) with which a user (e.g., a person, another application, an application programming interface, etc.) interacts. In some embodiments, interacting with an element causes the application to perform a function. In some embodiments, an "element" is a button, hyperlink, text box, text area, check box, slider, radio button, menu, menu item, scroll bar, drop down menu, list item, combo box, toggle button, spin button, tool bar, widget, image, window, calendar, tab strip, list box, thumbnail, etc. In some embodiments, an element is a web page or screen. In some embodiments, an element comprises other elements, e.g., a web page comprising one or more buttons, text fields, etc. In some embodiments, source code corresponding to an element or associated with an element is mappable to a visible element presented on a screen of a client device for viewing by a user. An element has one or more attributes and/or attribute values, e.g., that can be provided by analyzing the visual render, text, code, and/or context of the element.

As used herein, the term "target element" is an element on which an action (e.g., of a test case and/or a step of a test case) is to be performed (e.g., by the test case and/or step of a test case). For example, if a step of a test case is "click on the login button", the element that is the login button is the target element of the test case step.

As used herein, the term "attribute" refers to data that identify and/or describe the appearance, behavior, and/or content of an element. An element may have any number of attributes, e.g., element type; location on a screen, window, or page; color; text; size; border; typeface; and code associated with the element. In some embodiments, attributes have "attribute values"—for example, the location attribute may have an attribute value comprising x, y coordinates describing a screen location. Attribute values may be integral, continuous, and/or discontinuous; numbers; classes; types; categories; etc.

As used herein, the term "visual render" of an element refers to the visual (e.g., graphical) representation of visual attributes and/or attribute values of an element as rendered on a software application (e.g., web application (e.g., a web page)) UI. In some embodiments, visual attributes and/or attribute values of an element are provided by analyzing the visual render (e.g., a bitmapped screen shot) of a UI to identify elements on the UI and assign element attributes and/or attribute values to the elements of the UI.

As used herein, the term "language" or "text" of an element refers to the text attributes and/or attribute values of an element, e.g., the characters (e.g., ASCII, Unicode, etc.) and/or strings of characters that are associated with an element. In some embodiments, text attributes and/or attribute values of an element are words or phrases (e.g., comprising one or more words separated by a non-word space) displayed within, around, and/or near an element.

As used herein, the term "code" of an element refers to data that defines attributes and/or attribute values of the element and/or software code that produces the element on a software application (e.g., a web application (e.g., a web page)) UI, e.g., software that causes an image of the element to be produced on a display when the code is executed. As used herein, in some embodiments, the code of an element is an attribute of an element; in some embodiments, analysis of the code of an element provides one or more attributes and/or attribute values of an element.

As used herein, the term "context" of an element refers to an attribute of the element describing the relationship of the element to other elements of a software application (e.g., web application (e.g., web page)) UI. In some embodiments, the context of an element comprises one or more of: the distance between the element and other elements, element attributes and/or attribute values of the element and other elements, distributions of element attribute values on the UI, and/or relative location of the element with respect to other elements. In some embodiments, the context of an element is determined for an element based on elements (e.g., element location, element attributes and/or attribute values, distribution of attribute values, distances between elements) in the "local neighborhood" of the element. As used herein, the "local neighborhood" of an element is a region of a UI that is closer in distance to an element than the distance to other regions of the UI that are not in the local neighborhood. In some embodiments, the local neighborhood is defined by a distance cutoff describing a locus or region surrounding the element. In some embodiments, the local neighborhood is defined by the nearest neighboring elements to an element (e.g., the set of elements closest to an element). In some embodiments, the local neighborhood is defined by the nearest neighboring elements to an element (e.g., the set of elements closest to an element) and the next-nearest neighboring elements to the element (e.g., the set of elements closest to an element and the set of elements next closest to the element). In some embodiments, the local neighborhood is defined by the nearest neighboring elements to an element (e.g., the set of elements closest to an element), the next-nearest neighboring elements to the element (e.g., the set of elements closest to an element and the set of elements next closest to the element), and the next-next-nearest neighboring elements to the element (e.g., the set of elements closest to an element, the set of elements next closest to the element, and the set of elements next closest to the element outside the closest and next closest elements).

As used herein, a "selector" is a logical rule or pattern that identifies a set of elements, e.g., a set comprising zero (an empty set), one, or a plurality of elements. In some embodiments, a selector identifies elements specified by element type, elements specified by element attribute (e.g., id, class, etc.), and/or elements specified by element location (e.g., by element location relative to other elements).

As used herein, the term "user" refers to a person (e.g., real or virtual) that interacts with an application (e.g., with an element of an application). In some embodiments, a user is a person (e.g., that interacts with an application through a graphical user interface). In some embodiments, a user is another application (e.g., a script) or software component that interacts with an application.

As used herein, the term "a user sequence" is a series of actions that mimic interaction of a user with one or more elements of a web application UI.

As used herein, the terms "module" or "component" refer to hardware or software implementations configured to perform the actions of the module or component. In some embodiments, a module or component is a software object or software routine that is stored on and/or executed by general purpose hardware (e.g., computer-readable media, processing devices, etc.). In some embodiments, components and/or modules are implemented as objects or processes that execute on a computing system (e.g., as separate threads). While some of the systems and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modules executing on a computing system.

As used herein, the term "browser" refers to a software application for retrieving, presenting, and traversing information resources on the World Wide Web, such as, for example, Mozilla Firefox, Internet Explorer, Microsoft Edge, Google Chrome, Apple Safari, or any other web browser provided for use on a desktop, laptop, and/or mobile device.

As used herein, the term "user interface" (UI) refers to a program interface that utilizes displayed graphical information to allow a user to control and/or operate a software application (e.g., a web application (e.g., a web page)), for example, by a pointer and/or a pointing device. A pointer may refer to a cursor, arrow, or other symbol appearing on a display and may be moved or controlled with a pointing device to select objects, populate fields, input commands, etc. via the UI. A pointing device may refer to any object and/or device used to control a cursor and/or arrow, to select objects, to populate fields, or to input information such as commands and/or drop-down menu options, for example, via a UI of the web application. Such pointing devices may include, for example, a mouse, a trackball, a track pad, a track stick, a keyboard, a stylus, a digitizing tablet, a digital pen, a fingertip in combination with a touch screen, etc. A cursor may refer to a symbol or pointer where an input selection or actuation may be made with respect to a region in a UI.

As used herein, the terms "click" or "clicking" refer to a selection process made by any pointing device, such as a mouse, for example, but use of such terms is not intended to be so limited. For example, a selection process may be made via a touch screen. In such a case, "clicking" may be replaced by "touching" or "tapping". However, these are merely examples of methods of selecting objects or inputting information, and claimed subject matter is not limited in scope in these respects.

As used herein, the term "interact with an element" refers to performing an action (e.g., clicking) on an element of a web application UI to select it, change its state, select an option from a list, activate a pull-down menu, input a value, select a value, and the like.

As used herein, the term "test case" refers to a defined set of actions and/or inputs performed on a software application that generates a defined set of outputs. Generally, a test case includes instructions specifying actions and/or inputs, predicted results, and a set of execution conditions. The test case can be viewed as a predetermined collection of one or more actions involving one or more elements of a software application. In some embodiments, a test case comprises a series of actions and/or inputs executed in a predetermined order specified in a test case script to simulate use of a software application or system by a user. Each input and/or action executed may be represented by individual test cases that can be joined together to represent a more complex sequence of actions within a larger test case. In some embodiments, a test case is executed to identify errors needing repair in a software application or in components of an interrelated system.

As used herein, the term "script" refers to a sequence of user-computer interactions within a user interface that achieves some goal within a computer program or web application. Examples of goals include changing a user password; performing a purchase transaction within a web application; joining a team/group to grant authorizations to read, write, or destroy files controlled by the group; or verifying/changing an email address associated with a user account. Thus, in some embodiments, a script defines a sequence of discrete steps (e.g., interacting with an element)

taken by a simulated user, web application, and/or browser to perform a certain task. For example, the script may define a step such as the click of a button in a web application to move to the next screen of the application. In another example, the script may include a step that waits for the web application to validate a first input with a second input before accepting the first input as a password. In some embodiments, a script is routinely executed by a computer to test a web application, e.g., after a change is made to a web application (e.g., after a change is made to the UI of a web application). In some embodiments, a script is run periodically, e.g., hourly, daily, weekly, monthly, and/or yearly. In some embodiments, scripts are executed automatically each time new code is committed to the master branch of a code repository. In some embodiments, scripts simulate user actions using steps that input data at the operating system level. In some embodiments, scripts are written to track output at the operating system level. For example, an operating system level script may include steps that click particular pixels on a screen or that monitor the change in the color of a pixel on a screen. In some embodiments, scripts are provided in a database.

Visual Validation of a Software Test Case

In some embodiments, e.g., as shown in FIG. 1, the technology provides a method for visually validating a software test case. In some embodiments, methods comprise obtaining, providing, and/or recording a script for a software test case comprising a number of scripted user actions for interacting with a web page and/or application interface. In some embodiments, methods of visually validating a software test case comprise defining (e.g., by a user) a software test case, e.g., using a recording tool to capture data describing a number and/or series of user actions (e.g., one or more types of user actions, e.g., a mouseover, click, input, double-click, drag, select, pull-down, etc.), information in a document object model (DOM), and/or a screenshot of a web page. Thus, in some embodiments, methods comprise capturing (e.g., by a user using a recording tool) data describing a number and/or series of user actions (e.g., one or more types of user actions, e.g., a mouseover, click, input, double-click, drag, select, pull-down, etc.), information in the DOM, and the screenshot of the page to provide captured data. In some embodiments, methods comprise storing the captured data and/or using the captured data to execute a software test case locally or in the cloud (e.g., on a server, computer, virtual machine, etc. that is remote from the user). Accordingly, in some embodiments, methods comprise storing the captured data and/or and executing a software test case using the captured data. In some embodiments, executing a software test case comprises executing the software test case locally.

In some embodiments, methods comprise executing a software test case. In some embodiments, executing a software test case comprises performing (e.g., by a test case execution module provided by software and/or hardware) a number and/or series of actions (e.g., user actions), e.g., as provided by a test script. In some embodiments, the test script is provided by recording a number or series of actions as described above. In some embodiments, executing a software test case comprises executing the software test case in the cloud (e.g., on a server, computer, virtual machine, etc. remote from the user).

In some embodiments, methods comprise navigating an application work flow, e.g., as described in a script. In some embodiments, navigating an application work flow comprises performing element selection at each step of the software test case to navigate the application workflow. In some embodiments, methods comprise capturing DOM data and a screenshot during test execution (e.g., at one or more steps of the software test case). Accordingly, in some embodiments, executing a software test comprises capturing DOM data and/or capturing a screenshot at one or more steps of the software test. In some embodiments, the DOM data and/or screenshot is/are compared to previously recorded DOM and/or screenshot data, e.g., methods comprise comparing the DOM data and/or screenshot to previously recorded DOM and/or screenshot data. In some embodiments, methods comprise comparing a first DOM with a second DOM and/or comparing a first screenshot with a second screenshot.

In some embodiments, executing the software test case (e.g., executing the test script) comprises displaying a web page, web application, and/or a screen shot of a web page and showing the execution of each step of the test case (e.g., test script) on the web page, web application, and/or a screen shot of a web page to show execution of the script in real time. That is, the technology provides methods of displaying (e.g., through a graphical user interface) the actions, outputs, and/or results of each action executed by the test script. In some embodiments, the technology provides controls (e.g., elements on a graphical user interface that are manipulable by a user) to pause the executer of the test script, move backwards through steps of the test script (e.g., "rewind" the test script), move forwards through steps of the test script (e.g., "fast forward" the test script), and replay the test script. Accordingly, the technology allows users to view the execution of the actions of the test script, identify errors, and correct errors efficiently. Accordingly, embodiments allow a user to view execution of the test script (e.g., each step of the test script) through a graphical user interface and to pause and step through the steps of the test script, both forward and backward, to identify errors and correct the errors.

In some embodiments, methods comprise identifying a visual variation in a screenshot by comparing a second screenshot to a first screenshot. In some embodiments, comparing a second screenshot to a first screenshot is used to produce a screenshot visual variation. In some embodiments, the screenshot visual variation is associated with an element and/or an action performed on an element during software test execution. In some embodiments, methods comprise using DOM data to identify elements on a web page. In some embodiments, methods comprise using DOM data and a visual variation in a screenshot to identify elements on a web page. In some embodiments, methods comprise segmenting a screenshot to produce element subsegments using DOM data and a screenshot visual variation.

In some embodiments, methods comprise visually validating test case execution, e.g., by correlating (e.g., associating) a screenshot visual variation (e.g., determined by comparing a second screenshot relative to a first screenshot) with elements in the DOM. In particular embodiments, correlating (e.g., associating) a screenshot visual variation with elements in the DOM comprises determining, retrieving, and/or evaluating the relative tree position of elements in the DOM hierarchy. In some embodiments, correlating (e.g., associating) the screenshot visual variation with elements in the DOM produces a correlation result. In some embodiments, the correlation result describes a correlation of a screenshot visual variation with one or more elements in the DOM. In some embodiments, the correlation result describes a correlation of an element subsegment produced from a screenshot with one or more elements in the DOM.

In some embodiments, the correlation result is provided (e.g., displayed, reported, etc.) to a user. Thus, in some embodiments, methods comprise displaying and/or reporting the correlation result to a user. In some embodiments, displaying and/or reporting the correlation result comprises displaying and/or reporting the correlation result in a graphical user interface observed by the user.

In some embodiments, displaying and/or reporting the correlation result in a graphical user interface observed by the user comprises displaying a screenshot of the website or app and overlaying on the screenshot one or more boxes to identify the corresponding elements found by the visual validation process described above. That is, in some embodiments, methods comprise using a screenshot visual variation and a DOM to identify a subregion (e.g., subsegments) of a screenshot that corresponds (e.g., is correlated with and/or associated with) to an element of the webpage and drawing a box on the screenshot to circumscribe the element on the webpage (e.g., to identify an element of the webpage). Accordingly, methods comprise identifying a subregion (e.g., a subsegment) of a screenshot (e.g., using a screenshot visual variation and a DOM) that corresponds (e.g., is correlated with and/or associated with) to an element of the webpage and drawing a box on the screenshot to identify the subregion.

In some embodiments, methods comprise confirming (e.g., by a user) the correctness of the identified elements, e.g., confirming the positions of the boxes overlaid on the screenshot. In some embodiments, methods comprise indicating (e.g., by a user) an error of the identified elements, e.g., indicating an incorrect position of a box overlaid on the screenshot. In some embodiments, methods comprise acting (e.g., by a user), e.g., clicking, on incorrectly positioned box and/or on an element that was incorrectly identified by a box or that was not identified by a box. In this way, a user may indicate using the graphical user interface an element that should have been selected by the test case when an element is misidentified and/or not identified by the method. In some embodiments, methods comprise sawing and/or using data from the user to reinforce the element selection model so that subsequently executing the test case results in a successful test. In some embodiments, methods comprise providing the data from the user to artificial intelligence and/or to a machine learning model to maximize and/or increase the occurrence of successful tests.

In contrast to previous technologies, the technology described herein uses information in the page DOM to assist with image (e.g., screenshot) segmentation to produce subregions of a screenshot comprising web page elements. Furthermore, the technology uses user data indicating a correct or incorrect identification of subregions comprising web page elements and a feedback mechanism to reinforce the test execution model that increases test case accuracy over subsequent tests over time. The present technology increases the accuracy of test case execution and reduces the amount of time it takes to maintain a test case as a website or app changes over time.

Previous technologies have not used data in the page DOM because capturing the amount of data in the DOM is slow and requires cumbersome data management. The technology described herein captures DOM data in real time and the capture is not noticeable by the test recorder. In particular, the technology comprises and/or provides a test case recorder (e.g., a test case recorder software module and/or component) that comprises a custom method that is run in a browser (e.g., using javascript) to obtain the DOM data. Accordingly, the technology provided herein is faster than iterating the DOM directly in a for loop. The increased efficiency thus provides that the DOM data and screenshot are captured substantially simultaneously.

Accordingly, the technology described herein performs with an efficiency that provide for the DOM data and a corresponding screenshot data to be obtained substantially simultaneously, e.g., with minimal or no time lag. Without this efficiency, the DOM data and screenshot data may not always correspond due to changes in the web page as a function of time and obtaining the DOM data and screenshot data at different times, especially in instances of page animation or dynamic loading. Accordingly, previous technologies have not used DOM data because the DOM data and the screenshot would not be correlated. Hence, current solutions have focused on improving element classification algorithms, which is a technology distinct from the present technology that uses DOM data to improve the segmentation of a screenshot for identification of elements.

Some embodiments of the technology provided herein further comprise functionalities for collecting, storing, and/or analyzing data. For example, in some embodiments the technology comprises systems comprising a processor, a memory, and/or a database; and/or comprises methods using a processor, a memory, and/or a database for, e.g., storing and executing instructions, analyzing data, performing calculations using the data, transforming the data, and storing the data. Moreover, in some embodiments, a processor is configured to perform a method described herein (e.g., a method for visually validating a software test case). In some embodiments, the processor is used to initiate and/or terminate the performance of a method and/or data collection. In some embodiments, the technology comprises and/or provides a device comprising a user interface (e.g., a keyboard, buttons, dials, switches, and the like) for receiving user input that is used by a processor to perform a method. In some embodiments, a computing device further comprises a data output for transmitting data to an external destination, e.g., a computer, a display, a network, and/or an external storage medium.

In some embodiments, steps of the described methods are implemented in software code, e.g., a series of procedural steps instructing a computer and/or a microprocessor to produce and/or transform data as described above. In some embodiments, software instructions are encoded in a programming language such as, e.g., Selenium, BASIC, NeXTSTEP, RealBasic, C#, C, C++, Objective C, Java, MATLAB, Mathematica, Perl, Python, Ruby, Object Pascal, Swift, Scala, Common Lisp, SmallTalk, UNIX, R, or other script language used for testing a web page or app.

In some embodiments, one or more steps or components are provided in individual software objects connected in a modular system. In some embodiments, the software objects are extensible and portable. In some embodiments, the objects comprise data structures and operations that transform the object data. In some embodiments, the objects are used by manipulating their data and invoking their methods. Accordingly, embodiments provide software objects that imitate, model, or provide concrete entities, e.g., for numbers, shapes, data structures, that are manipulable. In some embodiments, software objects are operational in a computer or in a microprocessor. In some embodiments, software objects are stored on a computer readable medium.

In some embodiments, a step of a method described herein is provided as an object method. In some embodiments, data and/or a data structure described herein is provided as an object data structure.

Some embodiments provide an object-oriented pipeline for processing data, e.g., comprising one or more software objects, to produce a result.

Embodiments comprise use of code that produces and manipulates software objects, e.g., as encoded using a language such as but not limited to Selenium, BASIC, NeXTSTEP, RealBasic, C#, C, C++, Objective C, Java, MATLAB, Mathematica, Perl, Python, Ruby, Object Pascal, Swift, Scala, Common Lisp, SmallTalk, UNIX, R, or other script language used for testing a web page or app.

In some embodiments, the technology provided herein comprises technologies described in U.S. patent application Ser. Nos. 17/281,566; 17/287,732; 17/287,739; and Ser. No. 16/595,356, each of which is explicitly incorporated herein by reference in its entirety.

Although the disclosure herein refers to certain illustrated embodiments, it is to be understood that these embodiments are presented by way of example and not by way of limitation.

Example

During the development of embodiments of the technology provided herein, technologies were developed that efficiently collect DOM from websites. In particular, a TreeWalker instance was created, e.g., using the Document.createTreeWalker( ) creator method provided by developer.mozilla.org/en-US/docs/Web/API/Document/createTreeWalker. Next, a custom, non-standard NodeFilter was built (e.g., having binary code "1029") that collects visual elements and text nodes from a web page in the same pass. The process was repeated recursively, e.g., to collect elements hidden in shadow DOMs or other iFrames, to collect visual elements and text nodes from a web page efficiently.

Data collected from tests of the DOM collection technology indicated that the DOM collection technology is approximately 10× faster than using a loop (e.g., document.forEach) to obtain each element on the page.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A method, in a computer system including a processor, for automated validation of a software test case, said method comprising:
the processor obtaining a first screenshot of a web page and storing the first screenshot as a bitmap;
the processor executing program instructions to perform a step of a test script of user actions acting on said web page;
the processor capturing a second screenshot of said web page in conjunction with the step and storing the second screenshot as a bitmap;
the processor, substantially simultaneously with capturing the second screenshot, obtaining document object model (DOM) information regarding the web page, wherein obtaining document object model (DOM) information regarding the web page includes recursively collecting, using a node filter, DOM information from different page structures in multiple passes, wherein each pass collects DOM information for both visual elements and text elements of the web page;
the processor identifying a web page element of the web page using both the DOM information and variation between the bitmaps of the first and second screenshots; and
the processor, based on the identifying, providing an output indicating a subsegment of the web page in which the web page element was identified.

2. The method of claim 1, wherein providing the output further comprises:
the processor displaying a selected screenshot among the first screenshot and the second screenshot; and
the processor visually demarcating the subsegment of the selected screenshot as including an image of the web page element.

3. The method of claim 1, further comprising the processor providing said test script by recording user actions.

4. The method of claim 1, further comprising:
the processor receiving user input indicating whether or not the subsegment of the web page identified in the output correctly identifies the web page element.

5. The method of claim 4, further comprising the processor training web page element selection by a model and/or a neural network using said user input.

6. The method of claim 1, wherein executing a step of a test script of user actions comprises executing the step on a cloud computing component.

7. The method of claim 1, wherein executing a step of a test script of user actions comprises modeling a user action of selecting the web page element.

8. The method of claim 1, further comprising segmenting the first screenshot or second screenshot using the visual screenshot variation and DOM information to provide a segment of the first screenshot or second screenshot including an image of the web page element.

9. The method of claim 1, further comprising:
correlating at least one of the following pairs:
the web page element and the visual screenshot variation;
a DOM element in the DOM information and the visual screenshot variation.

10. The method of claim 9, further comprising displaying a correlation result of the correlating.

11. The method of claim 1, further comprising:
displaying on a graphical user interface at least one of the following:
said web page;
the first screenshot of said web page;
the second screenshot of said webpage; and
displaying, on the graphical user interface, results of steps of the test script of user actions.

12. The method of claim 1, further comprising:
receiving and acting upon a control input to pause performance of steps of said test script or to step through one or more steps of said test script.

13. The method of claim 4, further comprising:
the processor, based on the user input indicating the subsegment of the webpage identified in the output correctly identifies the web page element, passing the test case.

14. A computer system, comprising:
a data storage device storing program code; and
a processor communicatively coupled to the data storage device, wherein the processor is configured to execute the program code to cause the computer system to perform:
obtaining a first screenshot of a web page and storing the first screenshot as a bitmap;
executing program instructions to perform a step of a test script of user actions acting on said web page;
capturing a second screenshot of said web page in conjunction with the step and storing the second screenshot as a bitmap;
substantially simultaneously with capturing the second screenshot, obtaining document object model (DOM) information regarding the web page, wherein obtaining document object model (DOM) information regarding the web page includes recursively collecting, using a node filter, DOM information from different page structures in multiple passes, wherein each pass collects DOM information for both visual elements and text elements of the web page;
identifying a web page element of the web page using both the DOM information and variation between the bitmaps of the first and second screenshots; and
based on the identifying, providing an output indicating a subsegment of the web page in which the web page element was identified.

15. The computer system of claim 14, wherein:
the computer system includes a display and user input device; and
the program code further causes the computer system to perform:
displaying, within the display, a selected screenshot among the first screenshot and the second screenshot; and
visually demarcating the subsegment of the selected screenshot as including an image of the web page element.

16. The computer system of claim 15, wherein the program code further causes the computer system to perform:
receiving, via the user input device, user input indicating whether or not the subsegment of the web page identified in the output correctly identifies the web page element.

17. The computer system of claim 16, wherein the program code further causes the computer system to perform:
based on the user input indicating the subsegment of the webpage identified in the output correctly identifies the web page element, passing the test case.

18. A program product, comprising:
a non-transitory data storage device; and
program code stored within the data storage device that, when executed by a processor of a computer system, causes the computer system to perform:
obtaining a first screenshot of a web page and storing the first screenshot as a bitmap;
executing program instructions to perform a step of a test script of user actions acting on said web page;
capturing a second screenshot of said web page in conjunction with the step and storing the second screenshot as a bitmap;
substantially simultaneously with capturing the second screenshot, obtaining document object model (DOM) information regarding the web page, wherein obtaining document object model (DOM) information regarding the web page includes recursively collecting, using a node filter, DOM information from different page structures in multiple passes, wherein each pass collects DOM information for both visual elements and text elements of the web page;
identifying a web page element of the web page using both the DOM information and variation between the bitmaps of the first and second screenshots; and
based on the identifying, providing an output indicating a subsegment of the web page in which the web page element was identified.

19. The program product of claim 18, wherein:
the computer system includes a display and user input device; and
the program code further causes the computer system to perform:
displaying, within the display, a selected screenshot among the first screenshot and the second screenshot;
visually demarcating the subsegment of the selected screenshot as including an image of the web page element.

20. The program product of claim 19, wherein the program code further causes the computer system to perform:
receiving, via the user input device, user input indicating whether or not the subsegment of the web page identified in the output correctly identifies the web page element.

21. The program product of claim 18, wherein the program code further causes the computer system to perform:
based on the user input indicating the subsegment of the webpage identified in the output correctly identifies the web page element, passing the test case.

* * * * *